United States Patent [19]
Thual

[11] Patent Number: 4,656,748
[45] Date of Patent: Apr. 14, 1987

[54] SUNDIAL ARRANGEMENT

[76] Inventor: Jacques G. Thual, 43 avenue Foch, 75116 Paris, France

[21] Appl. No.: 831,482

[22] Filed: Feb. 20, 1986

[30] Foreign Application Priority Data

Feb. 28, 1985 [FR] France ................................ 85 02946

[51] Int. Cl.[4] ........................ G04B 49/04; G01C 21/02
[52] U.S. Cl. ......................................... 33/270; 368/15
[58] Field of Search ................. 33/268, 270, 271, 267; 368/15, 62, 65, 54, 205, 10

[56] References Cited

U.S. PATENT DOCUMENTS 4,387,999 6/1983 Shelley ............................ 33/270 X

FOREIGN PATENT DOCUMENTS 2471627 6/1981 France ................................ 33/270
0065185 5/1980 Japan ................................ 368/65
0201086 11/1983 Japan ................................ 368/65

*Primary Examiner*—Harry N. Haroian
*Attorney, Agent, or Firm*—Steinberg & Raskin

[57] ABSTRACT

The present invention relates to a sundial arrangement comprising a screen portion provided with several slits allowing the passage of a narrow flat beam of solar rays and angularly spaced from one another to be successively traversed by the beam; a dial with several hour graduations; and a control circuit for bringing into operation a system of devices for filling containers, each representing a predetermined elapsed duration when filled up with water every time a slit is traversed by the beam of solar rays at a precise hour.

14 Claims, 5 Drawing Figures

SUNDIAL ARRANGEMENT

BACKGROUND OF THE INVENTION

The present invention relates to a sundial arrangement capable of indicating the time according to the position of the sun when the latter is apparent.

Sundials are known which are based on the displacement of the shadow of a style thrown on to a dial marked with the hours.

Such sundials, however, give an only approximative indication of the appropriate hour, which hour is never exactly accurate since the sun moves by a few degrees eastwards or westwards from is "true" position.

Moreover, such known sundials do not allow an easy reading from a distance, because of the insufficient contrast between the useful shadow and the illuminated surface of the dial.

SUMMARY OF THE INVENTION

The present invention has for a purpose to remove the above drawbacks of the known sundials by providing a sundial arrangement characterized in that it includes a screen portion provided with several slits allowing the passage of a narrow beam or pencil of solar rays and angularly spaced from one another so as to be successively traversed by the said beam of solar rays; a dial with several hour graduations; a system of means for filling containers visible from the outside and each representing a predetermined elapsed duration when filled up with a liquid such as water; a control device for bringing into operation the said filling system every time a slit is traversed, at a precise hour, by a beam of solar rays which addresses an hour graduation on the said dial.

According to one feature of the invention, the said arrangement includes means for opening the said slits, each associated with a slit and actuated by the said control device at the said precise hour.

According to still another feature of the invention, each said control device includes an element sensitive to the solar rays and a circuit with a microprocessor programmed according to the solar equation to actuate the said opening means when the said sensitive element receives the solar rays at the said hour.

According to a further feature of the invention, the said filling system includes several water jets associated with the hour graduations, respectively, of the said dial, each said water jet being brought into operation by the control device at the said precise hour.

According to still another feature of the invention, each opening means is constituted by a tubular element rotatably arranged in the associated slit and provided with a longitudinal opening for the passage of the said beam of solar rays.

BRIEF DESCRIPTION OF THE DRAWINGS

For a fuller understanding of the invention, reference is made to the following description, taken in connection with the accompanying drawings, in which.

DESCRIPTION OF THE PREFERRED EMBODIMENTS

Figure 1:
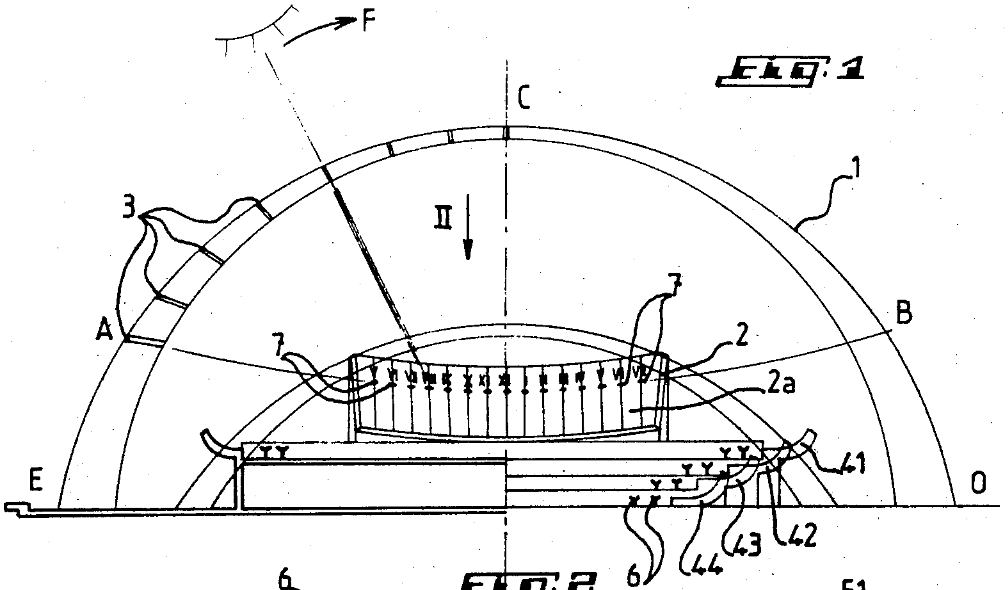
FIG. 1 is a front view of the sundial arrangement according to the present invention.
Figure 2:
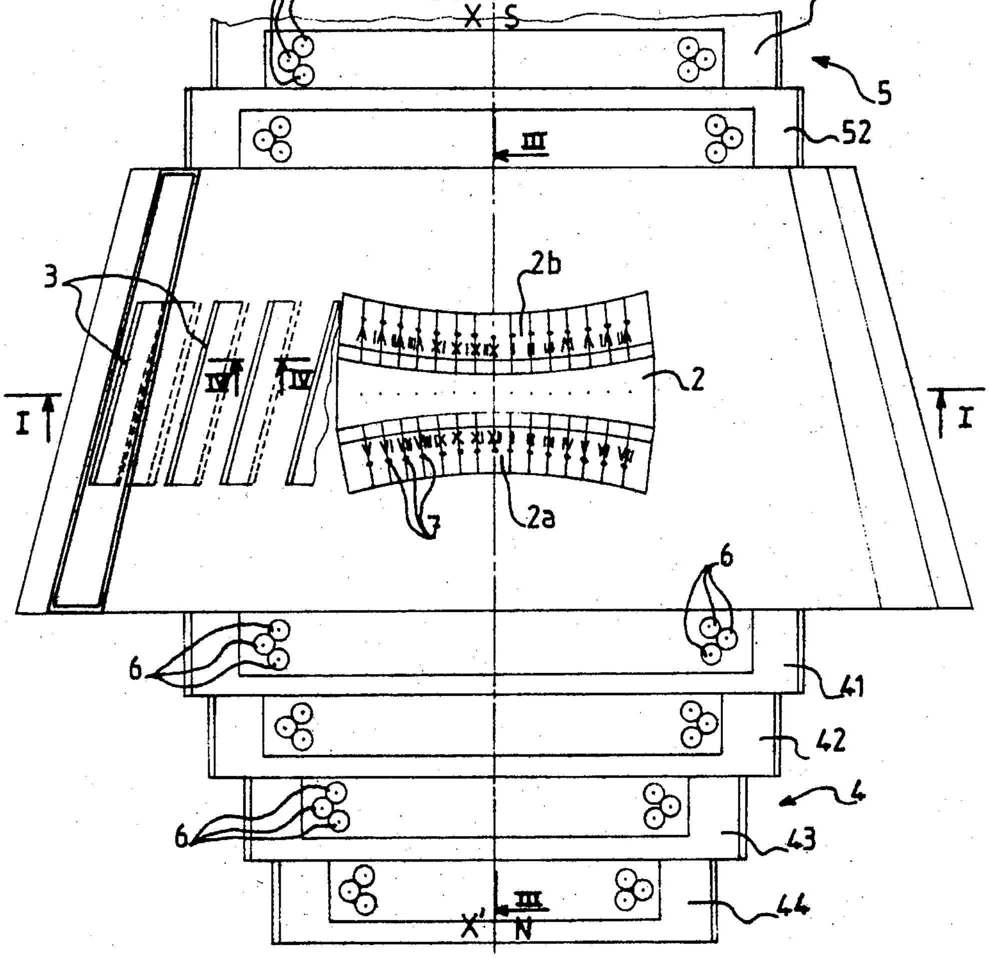
FIG. 2 is a stop view of the sundial arrangement of the invention in the direction of arrow II—II of FIG. 1.
Figure 3:
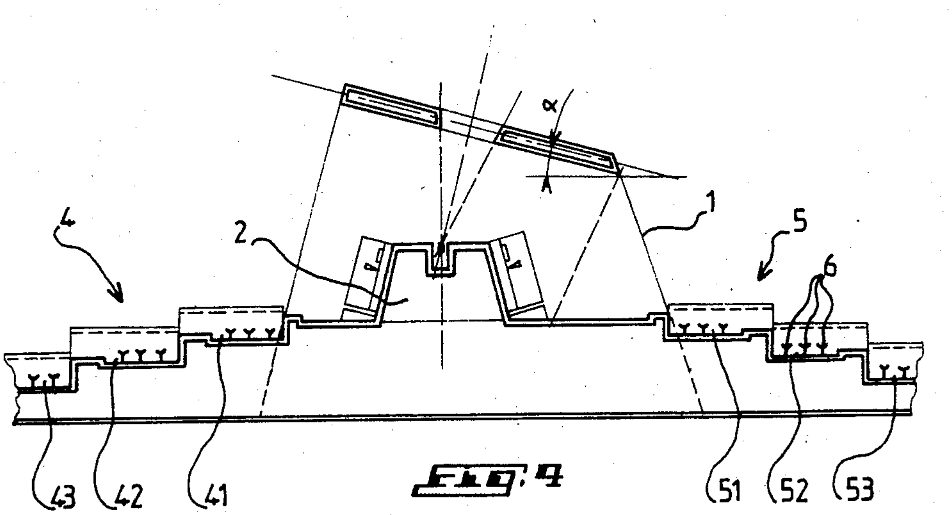
FIG. 3 is a sectional view upon the line III—III of FIG. 2.

Referring to FIGS. 1 to 3, the sundial arrangement of the invention is designed in the form of a building or like structure including a screen portion 1 which, in the case considered, is in the form of a vault or an arch, and a dial portion 2 situated under the vault-shaped screen.

The vault-shaped screen 1 is provided with a plurality of longitudinal slits 3 extending right through its thickness and opening onto both sides thereof at locations angularly spaced a regular distance from one another along the upper spherical screen portion comprised between the end points A and B of the circle arc defined thereby (only the longitudinal slits located on the upper spherical screen portion comprised between the end points A and C of one half of the circle arc A B being shown).

The dial 2 is generally in the form of a truncated pyramid having parallel bases and two large lateral sides **2*a*, 2*b* of concave shape. Each lateral side 2*a*, 2*b* of the dial 2 bears a plurality of hour graduations which, in the case considered, are represented by Roman numerals and which are arranged regularly along the concave portion in substantially the higher region of the truncated pyramid. The hour graduations are so dimensioned as to be visible from a distance on both sides of the dial 2**.

The slits 3 are contained in inclined planes, respectively, with respect to the vertical and are inclined in the said planes at an angle $\alpha$ to the horizontal, which angle is equal to the latitude of the place where the structure is installed, the slit contained in the plane passing through the point C located on the vertical being aligned with the vault longitudinal axis X-X′ corresponding to the polar axis.

In other words, the curve described by the upper portion of the vault 1 is inclined at an angle $\alpha$ to the horizontal.

From the foregoing explanations it is already understood that when the sun represented in FIG. 1 moves in the direction of arrow F, the solar rays pass successively through the slits 3 to form a narrow flat beam or pencil which falls on, or addresses, successively the various hour graduations of the dial 2 which are thus very visibly illuminated. Of course, the angular position of two successive slits 3 takes account of the angle described by the sun in one hour. Moreover, not only must the shape of the slits 3 take into account the inclination of the curve formed by the upper portion of the vault, but their lengths must also take account of the summer and winter solstices, which are the same in all latitudes, and their external widths must take account of the solar equation, or equation of time, in November and February, which are the extreme points of variation. FIG. 3 shows the slit length which is necessary to allow for the summer and winter solstices. It is thus understood that the disposition and inclination of the above-described structure will require, in each specific case and particularly in each specific place, relatively complex calculations which need not be described in more detail since they are outside the scope of the present invention.

The sundial arrangement of the invention also includes a first group 4 and a second group 5 of pools arranged symmetrically on either side of the dial 2 along the longitudinal axis X-X' and each representing a predetermined elapsed duration as will be explained later. Each group includes for example four pools in stepped arrangement denoted by the reference numerals 41 to 44 in group 4, only the pools 51 and 52 of group 5 not being depicted entirely.

When the pool 41 (or the pool 51) is entirely filled with a liquid such as water, the latter overflows and fills up the pool 42 (or 52), and when the latter is also completely filled, the liquid overflows into the pool 43 (53) which it fills up in its turn before overflowing into and filling up the pool 44, the durations of overflow of the content of each pool into the following adjacent pool being equal, for example, to a quarter of an hour. In each of the pools of groups 4 and 5 are arranged at least three vertical jets 6 with a progressive opening representing a predetermined duration smaller than the duration of filling of each of the pools which, in the case considered, is equal to 5 minutes. As illustrated, each pool is provided with two groups of three water jets 6 arranged symmetrically with respect to the longitudinal axis X-X' of the building or structure according to a triangular configuration.

The pool filling system includes a plurality of water jets 7 emerging from the dial 2 and situated directly below the hour graduations, the number of water jets 7 being equal to the number of graduations. Of course, as is known per se, each water jet 7 can be brought into operation by the opening of a valve connected to a means for the supply of water under pressure, such as a pump, from a source of water which may be a large water pool (not shown) in which the sundial structure of the invention is installed.

Figure 4:
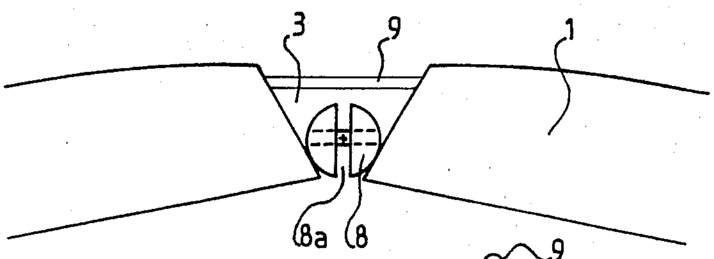
FIG. 4 is a sectional view upon the line IV—IV of FIG. 1.

The sundial arrangement of the invention also includes means for opening the slits 3, which, as shown in FIG. 4, may each be constituted by a tubular element 8 rotatably mounted in each slit and provided with a longitudinal opening 8*a* for the passage of a narrow flat beam or pencil of solar rays. The tubular element 8 in rest position has its opening arranged as shown in dotted lines, thus preventing the passage of the narrow flat beam of solar rays.

Each slit 3 is also provided with at least one element 9 sensitive to the solar rays, such as for example a photo-electric cell, a photo-voltaic cell or the like, and arranged very close to the outer surface of the vault.

Figure 5:
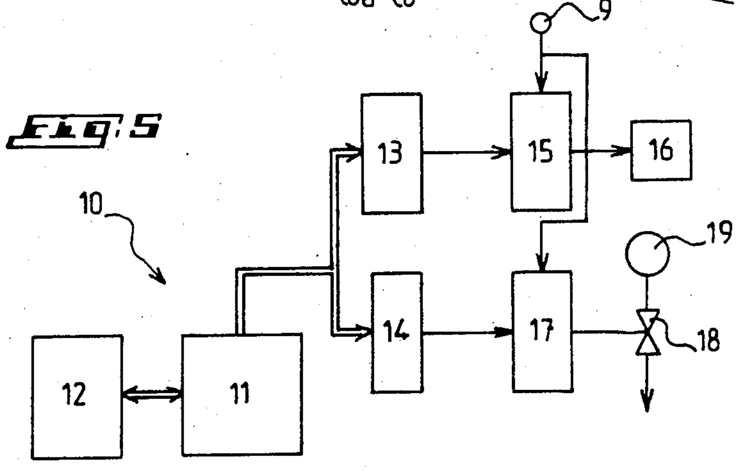
FIG. 5 is a block diagram of the electronic control device forming part of the sundial arrangement of the invention.

FIG. 5 shows the diagram of the electronic control circuit 10 ensuring both the rotation of the tubular element 8 and the bringing into operation of a water jet 7 at a precise hour.

The control circuit 10 is constituted, in the case considered, by a microprocessor including a central unit 11 under the control of a programme contained in a read-only memory 12 and designed according to the solar equation, or equation of time. The central unit 11 is connected through the medium of a undirectional information bus to two interface circuits 13 and 14. The output of the circuit 13 is connected to a switching means 15, such as for example a power transistor, connected to a device 16 for driving the tubular element 8, such as for example an electric motor. The output of the circuit 14 is connected to another switching means 17, such as a transistor, for actuating a valve 18 associated with a water jet 7. The reference numeral 19 denotes an electric pump which supplies the water from the aforementioned source to the valve 18.

The switching means 15 and 17 are enabled by an output signal of the sensitive element 9 when the latter is subjected to the solar rays. With each of the slits 3 is of course associated a control circuit 10 of the above-described type.

The general operation of the sundial arrangement of the invention will now be described.

When the sun moves in the direction of arrow F from east to west and is, for example, in the position illustrated in FIG. 1 and corresponding to the true time of 8 o'clock a.m., the microprocessor, at that true hour precisely and with the necessary correction taking into account the apparent diameter of the sun depending on the time of the year, then supplies a control information to the switching means 15 through the circuit 13. The switching means 15, being enabled by the sensitive element 9 upon the latter receiving solar rays, then causes the tubular element 8 to rotate through a quarter of a turn, the opening 8*a* of the tubular element then moving from the position shown in dotted lines to the position represented in FIG. 4. A narrow flat beam of solar rays thus passes through the opening 8*a* and falls on the hour graduations corresponding to VIII o'clock. Simultaneously with this rotation of the tubular element 8, there takes place the opening of the valve 18 through the circuit 14 and the switching means 17, so that both water jets 7 associated with this valve and located under the hour graduations corresponding to VIII o'clock, discharge water into the pools 41 and 51 which, upon the lapse of the first quarter of an hour, discharge into the pools 42 and 52, respectively, during a quarter of an hour, an so forth until the moment when, the hour having entirely elapsed (i.e. when the four pools are completely filled), the four pools empty, with the microprocessor causing the closing of the slit 3 by the tubular element 8 and of the valve 18, and the jet for the following hour is brought into operation at the following true hour by the associated microprocessor started by the solar rays falling on the following sensitive element 9, a narrow flat beam of solar rays addressing the corresponding hour graduation (IX o'clock) of the sundial 2. It should be noted that, once the hour has elapsed, both groups of pools can empty into the large pool surrounding the structure or building.

To improve the time-indicating accuracy, the two groups of three water jets 6 are brought into operation successively every five minutes elapsed, with a gradual increase in height of a visible sheaf-like column of water. Such water jets 6 may be controlled by the microprocessor of each circuit 10.

There is therefore obtained, according to the invention, a sundial arrangement, the hour indications of which are visible from a distance and which visualizes the hour to within five minutes owing to the groups 4 and/or 5 of pools and to the water jets 6 which also are visible from a distance.

Of course, various modifications of the above-described arrangement are possible without departing from the scope of the present invention. For example, the means for opening the slits 3, instead of being constituted by a tubular element, may consist of any other mechanical means causing the opening of a slit at the appropriate hour precisely. Moreover, instead of using groups of pools, each corresponding to a quarter of an hour, to represent an elapsed hour, use may be made of a plurality of pools in stepped arrangement, each representing an elapsed hour, water spheres associated with the pool representing an elapsed duration of a quarter of an hour for each hour. Lastly, the number of hour graduations engraved on the dial and therefore the number of water jets 7 depend upon the place where the sundial arrangement of the invention is installed.

What is claimed is:

1. A sundial arrangement, comprising a screen portion provided with several slits allowing the passage of a narrow beam of solar rays and angularly spaced from one another so as to be successively traversed by the beam of solar rays;

a dial with several hour graduations;

container means visible from the outside and representing a predetermined elapsed duration when filled up with a liquid;

liquid discharge means for filling said container means at a predetermined rate; and a control device for bringing said liquid discharge means into operation every time a slit is traversed by the beam of solar rays at a substantially precise hour, the beam addressing an hour graduation of said dial.

2. An arrangement according to claim 1, additionally comprising means for opening said slits and being actuated by said control device at the hour substantially precisely.

3. An arrangement according to claim 1, wherein said control device includes an element sensitive to the solar rays and a circuit with a microprocessor programmed according to a solar equation so as to bring said opening means into operation when said sensitive element receives the solar rays at the hour.

4. An arrangement according to claim 1, wherein said liquid discharge means include several jets associated with the hour graduations respectively of said dial, each jet being brought into operation at the hour to discharge liquid into said container means.

5. An arrangement according to claim 2, wherein said opening means are constituted by a tubular element rotatably arranged in each associated slit and provided with a longitudinal opening for the passage of a narrow flat beam of solar rays.

6. An arrangement according to claim 3, wherein said circuit including said microprocessor is also programmed so as to take into account the apparent diameter of the sun at various times of the year.

7. An arrangement according to claim 1, wherein said container means comprise four pools in stepped arrangement, each pool representing a definite duration of time.

8. An arrangement according to claim 7, wherein, in each said pool, are arranged at least three jets with a progressive opening, each representing an elapsed duration of time.

9. An arrangement according to claim 1, wherein said screen portion is in the form of a vault or arch inclined at an angle substantially equal to the latitude of a place where said screen portion is installed.

10. The arrangement of claim 1, wherein said liquid discharge means comprise a plurality of jets for filling said container means.

11. The arrangement of claim 1, wherein the liquid is water.

12. The arrangement of claim 10, wherein said container means comprise two containers, each container comprising four pools in stepped arrangement with each pool representing a definite duration of time.

13. The arrangement of claim 7, wherein each pool represents about a quarter of an hour.

14. The arrangement of claim 8, wherein the elapsed duration of time is about five minutes.

* * * * *